April 25, 1961 S. H. M. DODINGTON 2,981,943
VARIABLE POWER TRANSMITTER FOR DISTANCE
MEASURING INTERROGATORS
Filed Dec. 30, 1953 2 Sheets-Sheet 1

INVENTOR
SVEN H. M. DODINGTON
BY Ernest Fanwick
ATTORNEY

April 25, 1961 S. H. M. DODINGTON 2,981,943
VARIABLE POWER TRANSMITTER FOR DISTANCE
MEASURING INTERROGATORS
Filed Dec. 30, 1953 2 Sheets-Sheet 2

INVENTOR
SVEN H. M. DODINGTON

BY Ernest Fanwick
ATTORNEY

United States Patent Office 2,981,943
Patented Apr. 25, 1961

2,981,943

VARIABLE POWER TRANSMITTER FOR DISTANCE MEASURING INTERROGATORS

Sven H. M. Dodington, Nutley, N.J., assignor to International Telephone and Telegraph Corporation, Nutley, N.J., a corporation of Maryland Filed Dec. 30, 1953, Ser. No. 401,276

9 Claims. (Cl. 343—7.5)

This application relates to transmitters for use in closed servo loop systems involving two-way communication and more particularly to variable power transmitters for distance measuring equipment.

In the field of radio navigation, distance measuring equipment performs a needed and necessary service by providing a mobile unit with an indication of distance from a transponder unit at a known location. In general, the mobile unit comprises a transmitter and receiver coupled to ranging circuits whose output is connected to a display device. The mobile unit cooperates with a transponder, normally a ground beacon, at a known location. Distance measuring is initiated by the mobile unit's transmitter emitting a pulse coded interrogation which is received by the ground beacon transponder and retransmitted to the mobile unit whose receiver detects the reply. The ranging circuits of the mobile unit measure the elapsed time between the pulse coded transmitted interrogation and the received reply and converts this time measurement to an indication of distance, which is displayed on appropriate equipment such as distance meters.

Due to the great demands of frequency spectrum allocations for radio services, the assignment of frequency channels to mobile radio systems has become greatly complicated, in part due to the fact that transmitter power and receiver sensitivity must be great enough to operate over the longest contemplated path length and yet prevent mutual interference at short distances. These facts have led to ever-increasing requirements for selectivity and low response to spurious frequencies and in the final analysis actually limits the number of stations that can be accommodated in any given frequency bandwidth in any given area.

In the usual distance measuring equipment some alleviation of the above difficulties has been obtained. The transponder unit has normally been a fixed ground beacon while the mobile unit has been air-borne, and since to communicate with a distant ground station the aircraft must fly high, this automatically increased the distance to the nearest possible interfering ground station. The problem is still extremely severe, however, and the problem will increase as air-to-air operation of distance measuring equipment becomes more prevalent.

Perhaps the best solution to the above problems which will improve the situation to some extent is to limit the sensitivity and power of the mobile unit to that required for the particular job. Automatic gain control of receivers has met the requirement of automatically adjusting the sensitivity of the system so that the sensitivity of the mobile unit receiver is never excessive for that required for the particular function. In the known distance measuring equipment system a closed servo loop involving two-way radio communication is available and thus the opportunity of satisfying the second requirement, that is, by never using more power than is necessary to do the job, can be solved.

One of the objects of this invention, therefore, is to provide a transmitter having an automatic power control to adjust the power output relative to the operating path length between the transmitter equipment and a cooperating transponder.

Another object of this invention is to provide a communication system having a closed servo loop in which the power output of the transmitter is automatically controlled relative to the servo loop path length.

A further object of this invention is to provide a transmitter for use with distance measuring equipment, the power output of which is proportional to the operating communication range.

A feature of this invention is the control of the power output of the mobile transmitter section of a distance measuring equipment system. A control signal is obtained from the output of the range circuits which inversely controls the power output of the transmitter of the mobile unit relative to the distance between the ground station and the mobile unit. This signal can readily be used to control the output of the transmitter by controlling the bias voltage of the screen grid in the modulator tube or by causing some of the output to be coupled to a dummy load or by controlling the plate voltage supplied of the final amplifier stage or by controlling the grid drive of the carrier frequency oscillator amplifier stage.

The above-mentioned and other features and objects of this invention will become more apparent by reference to the following description taken in conjunction with the accompanying drawings, in which.

Figure 1:
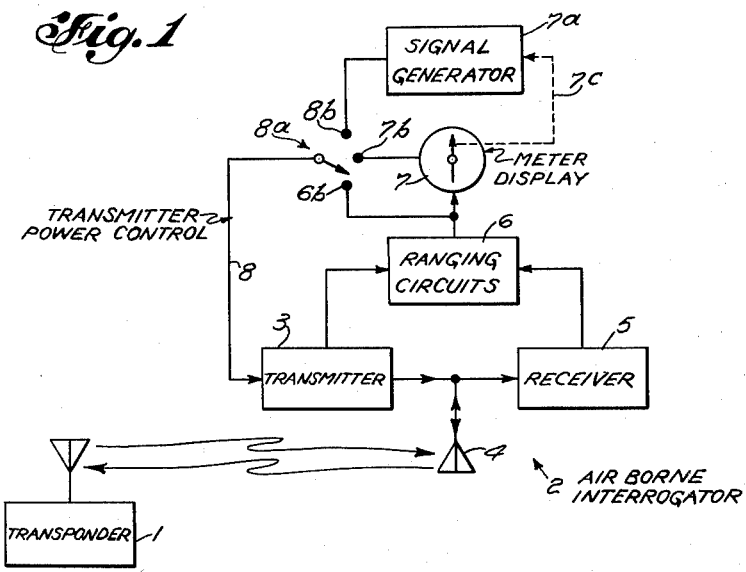
Fig. 1 is a block diagram of a distance measuring system utilizing the variable power interrogator of this invention.

Referring to Fig. 1 of the drawings, the distance measuring equipment system is therein shown to comprise a transponder 1 at a fixed ground station and cooperating mobile equipment 2. The cooperating mobile equipment 2 comprises a transmitter interrogator 3 whose output is coupled to an antenna 4. The signals received by antenna 4 are coupled to a receiver 5 whose output is connected to ranging circuit 6 where the time elapse between the output of transmitter 3 and the reception of reply signals by receiver 5 is measured. The output of the ranging circuit 6 is coupled to a meter 7 which displays an indication of distance between the mobile unit 2 and the transmitter 1. The output from meter display 7 or the ranging circuits 6 or signal generator 7a may be coupled by switch 8a to line 8 and coupled back to transmitter 3 to automatically control the power output of the transmitter 3 in response to the distance determination of the ranging circuits 6 and the reading on meter 7.

In order to initiate a distance measuring reading the interrogator or transmitter 3 emits a pulse coded signal which is radiated by transmitter 4 and received at the ground beacon 1 where it is retransmitted by the transponder and received by the mobile unit receiver 5. The outputs of transmitter 3 and receiver 5 are coupled to the ranging circuits 6 where the time elapse between interrogation and reply is measured. As is well-known to those skilled in the art the time elapse is proportional to distance between mobile unit 2 and transponder 1 and thus the output of ranging circuit 6 can be coupled to meter 7 to indicate the distance. If the meter 7 is of the volt-meter type, a voltage proportional to distance is available across a high impedance and this voltage can be readily used as a control signal by coupling its output to contact 7b and thence to control line 8. If the meter 7 is of the motor driven type having a high torque shaft, an additional potentiometer can be mounted on this shaft and directly produce a control signal or a mechanical linkage 7c can control the output of a signal generator 7a which is coupled to contact 8b of switch 8a. Alternately a control signal may be obtained directly from the output of ranging circuits 6 and coupled to line 8 by contact 6b and switch 8a.

Figure 2:
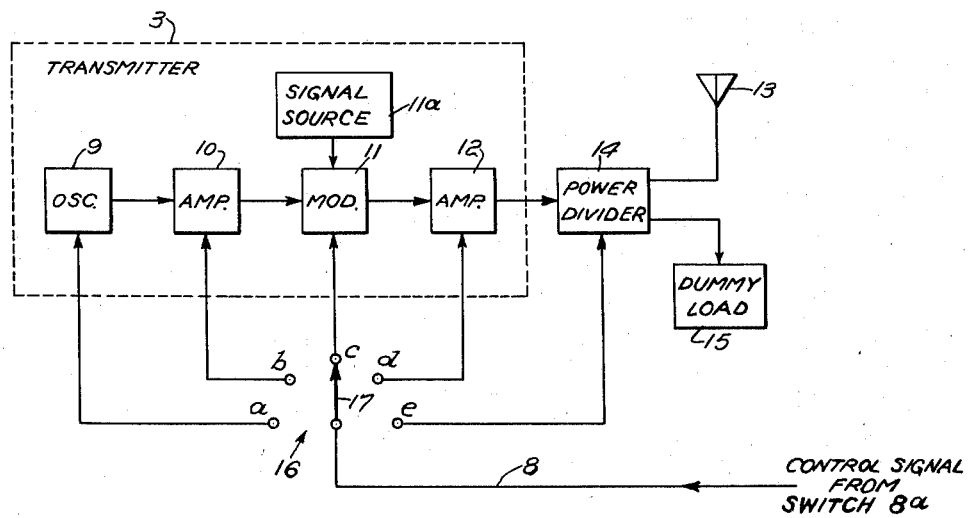
Fig. 2 is a block diagram of the transmitter portion of the variable power transmitter of this invention.

Referring to Fig. 2 of the drawing, a block diagram of one embodiment of the mobile unit transmitter or interrogator in accordance with the principles of this invention is shown comprising for purposes of explanation an oscillator 9 for producing carrier frequency energy which is coupled through an amplifier 10 to a modulator 11 where it is modulated by a pulse coded signal interrogation from signal source 11a. The modulated output is coupled through an amplifier 12 to a transmitter antenna 13. If desired, power divider 14 may proportion the output of amplifier 12 between the transmitting antenna 13 and a dummy load 15. The control signal from the distance meter 7 is utilized to vary the power output of the transmitter 3 is coupled through a switch 16. When the armature 17 of switch 16 is coupled to contact $a$ the control signal is fed to the oscillator 9. When the armature 17 of switch 16 is coupled to contact $b$ the control signal from the distance meter 7 is coupled to the amplifier 10. In either case the control signal may be used to vary the control grid drive on the electron discharge devices in either of these stages in a manner which is well-known to those skilled in the art. By varying the grid drive, the output of oscillator 9 or amplifier 10 can be reduced so that the final output of the transmitter 3 is also reduced. When the armature 17 of switch 16 is connected to contact $c$ the control signal from the distance meter 7 is coupled to the modulator 11 where it varies the screen grid voltage of the modulator tube. By thus varying the screen grid voltage the output of the modulator is reduced, thus reducing the output of transmitter 3. Alternately, the armature 17 of switch 16 may be coupled to contact $d$, thus causing the control signal from distance meter 7 to be connected to the final amplifier 12. By varying the plate supply of the final amplifier stage, the power output of the transmitter may also be varied. However, by varying the plate supply the range of power variation is limited rather severely when compared to the range of power variation obtainable by varying the grid voltages in the preceding stages. By coupling the control signal from distance meter 7 to power divider 14 via armature 17 and contact $e$ of switch 16 still another way of varying the power output of transmitter 3 is obtained. By causing the power divider 14 to couple all or none or any intermediate division thereof of the available transmitter power to antenna 13 and dummy load 15, any variation in power output between maximum and minimum is obtainable.

Figure 3:
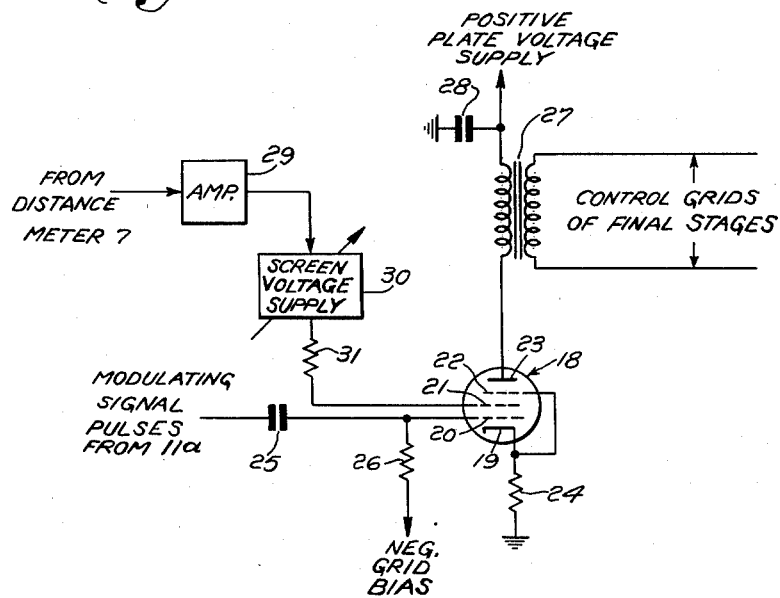
Fig. 3 is a schematic diagram of the modulator stage of the variable power interrogator of this invention.

Referring to Fig. 3, a circuit diagram of the modulator stage of Fig. 2 is shown to comprise a driver amplifier stage electron discharge device 18. Tube 18 is a pentode containing the usual cathode 19, control grid 20, screen grid 21, suppressor grid 22 and plate 23. In the usual manner the suppressor grid 22 is coupled to the cathode 19 which is grounded through resistor 24. The modulating signal pulses from source 11a are applied over coupling capacitor 25 to the control grid 20 of tube 18. A negative grid bias is provided via resistance 26 to the control grid 20. The output from plate 23 is coupled via transformer 27 to drive the control grid of final amplifier stages in a manner well-known to those skilled in the art. A positive plate voltage supply is coupled to the plate 23 and bypass condenser 28 is provided. The control signal from distance meter 7 is coupled through amplifier 29 to the screen voltage supply source 30 which is varied in accordance with the control signal. The output of the screen voltage supply source 30 is coupled over resistance 31 to the screen grid 21. As will be obvious the variation in the screen voltage supply source coupled to screen grid 21 varies the plate output of tube 18 and thus varies the power output of the transmitter 3.

Figure 4:
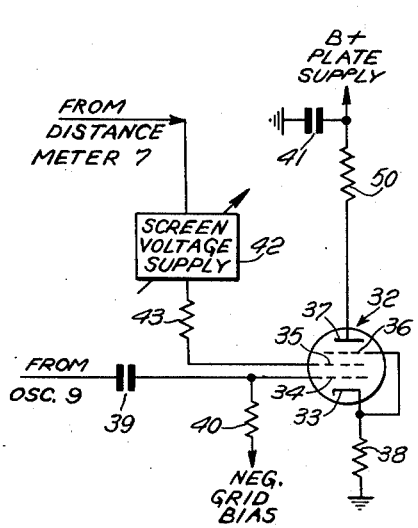
Fig. 4 is a schematic diagram partly in block form of one embodiment of an amplifier stage for use in the variable power interrogator of this invention.

Referring to Fig. 4, a schematic circuit diagram of one embodiment of an amplifier stage 10 for use in the block diagram of Fig. 2 is shown to comprise an electron discharge device 32 of the pentode type containing the usual cathode 33, control grid 34, screen grid 35, suppressor grid 36 and plate 37. In the usual manner the suppressor grid 36 is coupled to the cathode 33 which is grounded through resistor 38. The output of the oscillator 9 is applied via coupling capacitor 39 to the control grid 34 of tube 32. A negative grid bias is applied to control grid 34 over resistive coupling 40. A positive plate voltage supply is coupled to the plate 37 an R.-F. bypass capacitor 41 is provided. The control signal from distance meter 7 is coupled to a variable screen voltage supply source 42 which has its output varied in accordance with the control signal. The variable screen voltage supply is coupled over resistance 43 to the screen grid 35 to vary the output of tube 32 in accordance with the signal from distance meter 7. As will also be obvious to those skilled in the art resistance 40 may be made a variable resistance and the signal from distance meter 7 used to control the resistance of resistor 40 and thereby vary the bias on the control grid 34.

Figure 5:
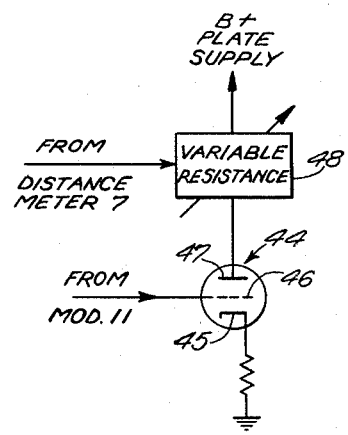
Fig. 5 is a schematic diagram partly in block form of an alternate embodiment of an amplifier stage for use in the variable power interrogator of this invention.

Referring to Fig. 5, an alternate embodiment of an amplifier stage for use in the variable interrogator of this invention is shown to comprise an electron discharge tube 44 having at least a cathode 45, grid 46 and plate 47. The output from modulator stage 11 is applied to the grid 46 for amplification. The B+ plate supply voltage is applied to plate 47 through a variable resistance 48. The amount of resistance between plate 47 and the plate supply voltage is controlled by the signal from distance meter 7 and thus by controlling the plate supply voltage the amplification factor is controlled. By controlling the plate supply voltage only a limited range of adjustment can be obtained in an amplification stage.

While I have described above the principles of my invention in connection with specific apparatus, it is to be clearly understood that this description is made only by way of example and not as a limitation to the scope of my invention as set forth in the objects thereof and in the accompanying claims.

I claim:
1. In a radio communication system having a mobile unit capable of interrogating a transponder unit at a remote location, said mobile unit including a mobile transmitter, a receiver, and means responsive to the interrogation signals of said transmitter and the reply signals of said transponder for determining the distance between said mobile unit and said transponder; the combination with said mobile unit of means coupled to said distance determining means to develop a control signal responsive to the output of said distance determining means and means to vary the power output of said mobile transmitter in response to said control signal.

2. In a radio communication system in accordance with claim 1 in which said mobile transmitter includes at least one amplifier stage having at least one electron discharge device with a plurality of biased electrodes, said control signal comprising a voltage potential in accordance with said distance and said means to vary the power output comprising means to couple said voltage potential to at least one of said electrodes to vary the bias thereon.

3. In a radio communication system in accordance with claim 1 in which said mobile transmitter includes at least one amplifier stage having at least one electron discharge device with a plurality of electrodes, a source of bias potential coupled to at least one of said electrodes, and means to vary the potential of said source in response to said control signal.

4. In a radio communication system according to claim 1 in which said mobile transmitter includes at least one modulator stage having at least one electron discharge device with a grid electrode, said control signal comprising a bias potential in accordance with said distance and said means to vary the power output comprising means to couple said control signal to said grid to vary the bias potential thereof.

5. In a radio communication system according to claim 1 in which said mobile unit includes an antenna and a dummy load, wherein said means to vary the output of said transmitter includes power divider means to proportion the output of said transmitter between said antenna and said load.

6. Distance measuring equipment comprising a transmitter for initiating distance measuring interrogations, a transponder at a location remote from said transmitter for receiving said interrogations and replying thereto, a receiver associated with said transmitter for detecting said replies, means for determining the time elapse between said interrogations and said received reply, means coupled to said time elapse determining means to develop a control signal representative of said time elapse and means to vary the power output of said transmitter responsive to said control signal.

7. Distance measuring equipment according to claim 6 which further includes means for generating a voltage proportional to said time elapse measurement, voltmeter display means for converting said voltage into a meter movement indicative of distance, and means for generating said control signal responsive to said meter movement.

8. A transmitter in a two-way communication system in which an indication of the distance of said two-way communication is available, said transmitter forming part of said two way communication system, comprising a source of radio frequency energy, a source of modulation signals, means to modulate said radio frequency energy with said modulation signals, an antenna, means including a distant terminal station forming a part of said two way communication system to generate a control signal representative of said distance and means to vary the instantaneous power of the energy coupled to said antenna responsive to said control signal.

9. A two way communication system comprising a first terminal station and a second terminal station in a two way communicating relationship with respect to each other, said first terminal station including a source of radio frequency energy, a source of modulation signals, means to modulate said radio frequency energy with said modulation signals, an antenna, means to couple said modulated energy to said antenna, means responsive to said modulated energy and energy received from said second terminal station to generate a control signal representative of the distance between said first and second terminal stations, and means to vary the instantaneous power to the energy coupled to said antenna responsive to said control signal.

References Cited in the file of this patent

UNITED STATES PATENTS

| | | |
|---|---|---|
| 2,491,276 | Mitchell | Dec. 13, 1949 |
| 2,530,418 | Alvarez | Nov. 21, 1950 |
| 2,542,983 | Beatty | Feb. 27, 1951 |
| 2,946,050 | Wathen | July 19, 1960 |